Aug. 6, 1929.  P. F. RAUEN  1,723,523
MILK CAN COVER NECK AND LID
Filed Aug. 25, 1928
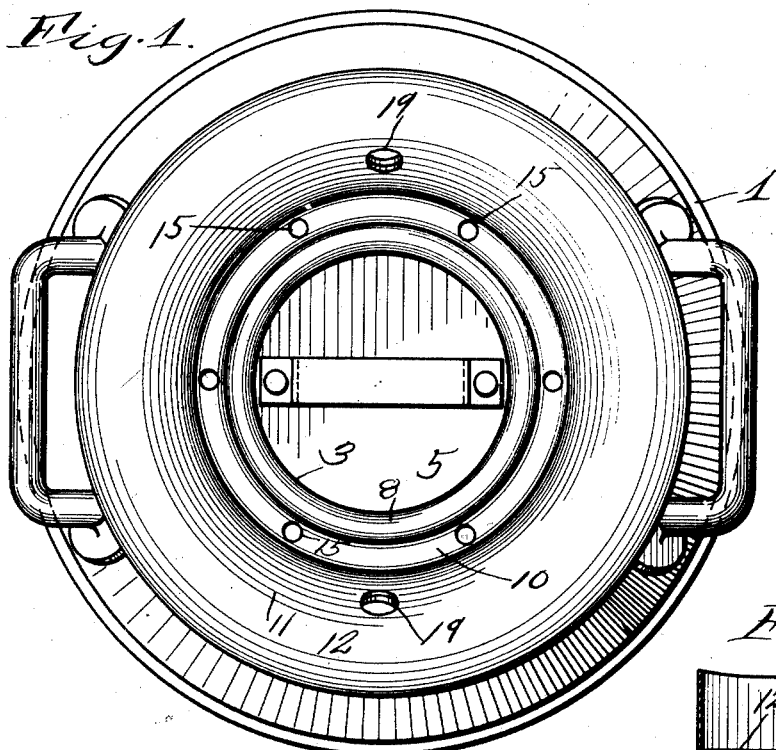
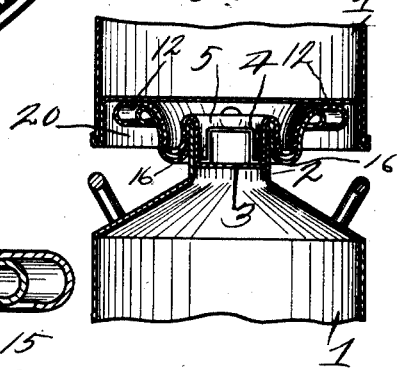
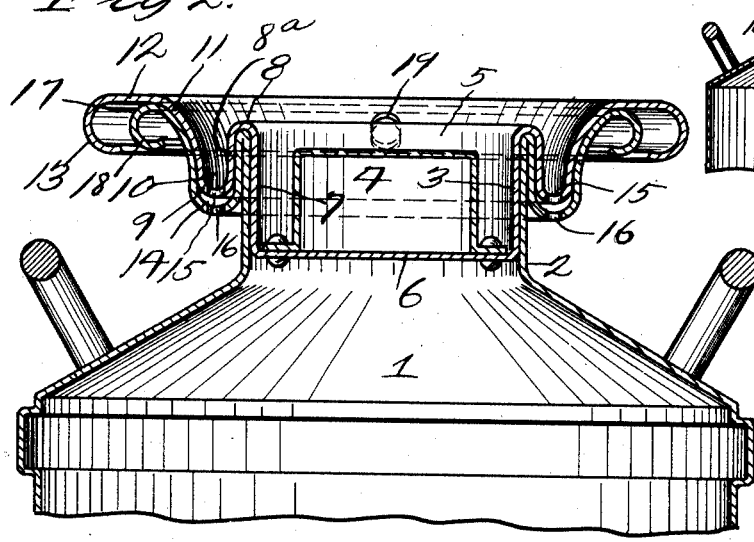
INVENTOR.
P. F. Rauen
BY
ATTORNEY.

Patented Aug. 6, 1929.

1,723,523

UNITED STATES PATENT OFFICE.

PETER F. RAUEN, OF OMAHA, NEBRASKA.

MILK-CAN-COVER NECK AND LID.

Application filed August 25, 1928. Serial No. 302,067.

The invention relates to milk can covers and has for its object to provide an improved construction of the invention upon which I have received Letters Patent under Patent Number 1,678,953 dated July 31, 1928.

A further object is to provide a combination which will embody features of said Patent No. 1,678,953 together with others which will obviate the necessity of attaching discharge spouts to provide drainage, and substitute therefor a multiplicity of perforated apertures leading from the bottom of an annular trough extending around said cover, and formed within the contiguous sides thereof so as to drain into a similar annular flared trough terminating the upper extremity of the neck of said milk can which engages the said can top trough, and having sufficient space between the respective bottoms of each to permit flow of water therethrough, and is provided also with similar apertures through which it may be discharged therefrom.

A further object is to provide the milk can cover with an annular flared trough having sufficient radial extremity to over reach the rolled edge of the can cover so that the said can top may shoulder upon said roll, terminating the can neck in such a manner as to enable it to sustain without displacement, the weight of heavy articles of merchandise which may be placed thereon, especially that of other cans which it is desirable to stack thereon.

A further object is to provide a can top having sufficient radial extremity to fully engage the cylindrical chamber formed within the inserted bottom of other cans of similar construction, so that they may be stacked in tiers without danger of upsetting or tilting.

A further object is to provide a top and cover having registering sealing apertures positioned whereby water dripping through the same can not find access to the interior of the can.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of the can and cover inserted therein.

Figure 2 is a vertical transverse sectional view through the upper end of the can.

Figure 3 is a vertical transverse sectional view through adjacent portions of superimposed cans.

Referring to the drawing, the numeral 1 designates the body of a conventional form of milk can, which body is provided with a neck 2, and disposed within the neck 2 is the cylindrical portion 3 of a cover 4, which portion 3 has a chamber 5 therein. Referring to Figure 2, it will be seen that a cross section through the cover reveals a profile comprising the bottom 6 of said cover, the upwardly extending sides 7 terminating at the upward extremity of the said chamber 5 in an annular rolled portion 8 where it shoulders upon the upper portion of the can neck, and from which it is rolled and extends downwardly to the bottom 9 of an annular trough 10 formed by an upward flared portion 11 terminating in a flattened annular portion 12 and in a portion 13, which is rolled under and indicates the extreme diameter of the cover.

Referring more particularly to the neck of the can it will be noted that it largely coincides with the cross sectional shape of the cover, extending upwardly and downwardly within the annular recess formed between the said cover portion 7 and 8$^a$ sufficiently below the bottom 9 of the trough 10, to form an annular trough 14 into which water may flow from the said chamber 5 over the upper extremity 8 and pass through apertures 15 into the said trough 14 and be carried away through a multiplicity of similar apertures 16 disposed in the bed of the trough 14.

The outer side of the annular trough 14 extends upwardly, coinciding with the flared portion 11 of the cover to its upper extremity, where it forms a second shouldering portion 17 upon which the cover rests and terminates in a roll 18.

Through portion 11 of the can cover 4 and the adjacent portion of the can neck upon opposite sides thereof, are sealing wire apertures 19 so positioned that water passing therethrough will find no access either through these apertures or between the coinciding surface, which they perforate to the inside of the can, but will be carried down through apertures 15 and 16 to the outside of the can.

In Figure 3 of the drawing is shown a conventional form of lower portion of a can similar to the can 1 wherein the bottom of the can is provided with a chamber 20 which is well adapted to engage the broad flattened portion 12 of the cover so as to afford a firm foundation that will prevent tilting or sliding whenever other cans are stacked thereon.

The invention having been set forth what is claimed as new and useful is:—

1. The combination of a chambered milk can cover disposed within the neck of a milk can, said cover having a downward fold over the neck of the said can, and an upwardly and outwardly flared flange cooperating in the formation of an intermediate annular trough having drainage apertures through the bed of said trough.

2. The combination of a chambered milk can cover disposed within the neck of a milk can, said cover having a downward fold over the neck of the said can and an upwardly and outwardly flared flange cooperating in the formation of an intermediate annular trough, the sides of which coincide with those of similar foldings of the can neck whereby a second trough is formed engaging the first with a drainage passage between and drainage apertures through their respective bottoms.

3. The combination of a chambered milk can cover disposed within the neck of a milk can, said cover having a downward fold over the neck of the said can and an upwardly and outwardly flared flange cooperating in the formation of an intermediate annular trough, the sides of which coincide with those of similar foldings of the can neck whereby a second trough is formed engaging the first with a drainage passage between and drainage apertures through their respective bottoms, said cover having an upper flattened outward annular portion adapted to engage the lower chambered portion of other cans stacked thereon and the said can neck terminating in an outer under rolled edge supporting the said upper flattened portion of said cover.

In testimony whereof I hereunto affix my signature.

PETER F. RAUEN.